May 16, 1944.　　　D. A. BAIRD　　　2,349,132
CLUTCH
Filed Feb. 27, 1942
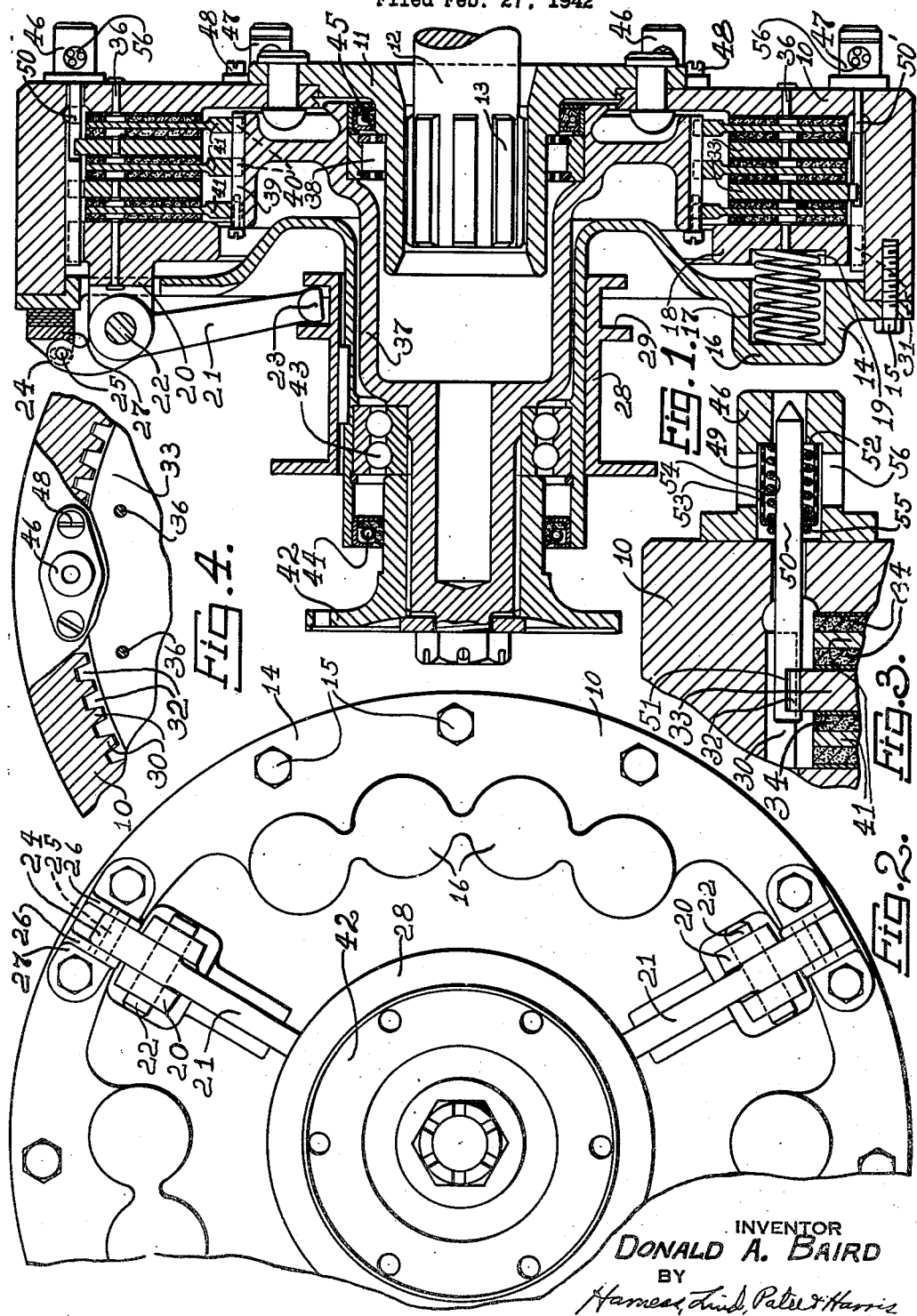
INVENTOR
DONALD A. BAIRD
BY
Hames, Lind, Patu & Harris
ATTORNEYS.

Patented May 16, 1944

2,349,132

UNITED STATES PATENT OFFICE 2,349,132

CLUTCH

Donald A. Baird, Detroit, Mich., assignor to Chrysler Corporation, Highland Park, Mich., a corporation of Delaware Application February 27, 1942, Serial No. 432,567

7 Claims. (Cl. 192—111)

This invention relates to clutches, particularly clutches of the heavy duty type such as those used in heavy tractors, trucks, earth moving machinery, military tanks, etc.

Multiple disc clutches are extensively used for heavy duty service and considerable difficulty has been experienced therewith due to "dragging" of the clutch plates. This "dragging" is caused by failure of one or more of the clutch plates to completely release when the clutch release mechanism is actuated and results in heating of the clutch, excessive wear of the friction surfaces besides rendering gear shifting difficult.

It is the principal object of the present invention to provide an improved clutch plate separator mechanism which will positively separate the driving plates or discs from the driven discs.

Another object is to provide a clutch plate separator that is self compensating for wear.

Additional objects and advantages of the invention will become apparent from the following description.

Fig. 1 is a longitudinal sectional view of a clutch embodying the invention.

Fig. 2 is a fragmentary elevation of the Fig. 1 clutch.

Fig. 3 is an enlarged detail section of one of the separator and wear compensating mechanisms, and Fig. 4 is a detail of the separator mechanism mounting, parts being broken away to show details.

In the drawing, 10 designates the engine flywheel which is of the "pot" type. The flywheel is carried by a hub 11 which is splined to the engine crankshaft 12 by means of the splines 13. A cover plate 14 is secured to the flywheel by cap screws 15 and has integral pockets 16 for carrying coil springs 17. There are a plurality of pockets as can be seen from Fig. 2 and the springs 17 constitute the pressure means for urging the clutch plates together.

A pressure plate 18 of annular form is formed with pockets 19 for accommodating the springs 17. Also carried by the pressure plate are lugs 20 to which are pivoted the release levers 21 by means of pins 22. The release levers have a long arm which terminates in a rounded portion 23 and a short arm having a rounded end 24. The shorter arm is pivotally attached by means of a pin 25 to ears 26 of a bracket 27 which is securely fastened to the outer marginal edge of the flywheel. The release mechanism also includes a sleeve 28 which has a channel 29 for receiving the rounded portions 23 of the release levers. The sleeve 28 is adapted to be manipulated by the usual pedal (not shown).

The outer cylindrical portion of the flywheel 10 is formed with internal teeth 30 which receive the teeth 31 of the pressure plate 18 and the teeth 32 of the driving discs 33. These discs are of annular shape and are provided with linings 34 of friction material, as are also the pressure plate 18 and the plate portion 35 of the flywheel. The lining is fastened to the plates and discs by rivets 36 as is common in the art.

The driven portion of the clutch comprises a hollow hub 37 journalled in the hub 11 by means of a roller bearing 38. The hub 37 has an annular toothed portion, the teeth 39 of which receive teeth 40 of the clutch driven discs 41. The latter are of metal and are annularly shaped. They are interleaved with the driving discs 33. The left end of the hub 37 carries a coupling member 42 and an anti-friction bearing 43. The bearing permits relative rotating between the driving and driven portions of the clutch. A lubricant seal 44 acts in conjunction with a seal 45 to seal the interior of the mechanism.

From the description so far, it may be seen that the pressure springs 17 exert pressure continuously on the pressure plate 18 which tends to cause adherence of the friction driving discs 33 to the driven discs 41 and thus torque is transmitted from flywheel 10 to hub 37.

Movement of the clutch release sleeve 28 toward the left causes corresponding leftward movement of the pressure plate and relieves the pressure on the discs 33 and 41. As these discs are free to slide axially on the teeth 30 and 39, there will be normally a separating action which will permit the driving portion to rotate free of the driven portion. It has been found, however, that the discs do not fully separate and there is always some drag on the driven discs unless some positive means is provided for assuring complete separation.

In the present improved device, a plurality of separating devices, designated 46, 47, are provided. These devices comprise (see Figs. 3 and 4) an attaching portion fastened to the flywheel by cap screws 48 and a cylindrical portion having a hollow bore 49. Slidably disposed within the bore of the body 46 is a rod 50 which extends inwardly through the flywheel and is provided with a recess 51 at its inner end. This recess is adapted to fit over one of the driving discs 33 as illustrated in Fig. 3, the teeth 32 being cut away or shortened if necessary to accommodate the rod.

The bore is enlarged beyond the shoulder 52 for slidably accommodating a perforated cup 53. A spring 54 bears against the shoulder 52 and the bottom of the cup and tends to push the cup inwardly, but the inward movement thereof is limited by an abutment forming ring 55 which is frictionally clamped around the rod 50 tightly enough such that the spring 54 cannot dislodge it and thus the ring serves as a stop.

The separating devices 47 are identical with those just described except that the rods 50' thereof are longer than the rods 50 so that the inner driving disc 33 may be engaged.

In the device being described, there are three separating devices for each driving disc equally spaced around the axis of the clutch. It will be understood that more or less of these devices could be used if necessary or desirable and if more than two driving discs are used separating devices with still longer rods may be provided.

The separating devices 46, 47 act automatically to compensate for wear on the friction surfaces as well as to separate the clutch discs. When the discs are engaged as illustrated in Figs. 1 and 3, the rods 50, 50' are thrust toward the right of the drawing and the open end of the cup 53 rests against the shoulder 52, the spring 54 being compressed. The friction snap ring is set automatically upon assembly of the parts in such position that the cup will rest against the shoulder when the clutch is engaged.

When the release mechanism 28 is actuated to release the clutch, the pressure plate 18 is shifted toward the left compressing the springs 17 and relieving the pressure on discs 33 and 41. The springs 54 of the separating devices 46, 47 then act to shift the discs 33 toward the left. This movement is assisted by the inherent vibration of the clutch parts and its extent is determined by the snap rings 55 which stop the movement of the rods when they engage the surface of the flywheel.

The rods 50' of the devices 47 must, of course, shift the discs with which they are operably associated twice as far as the rods 50 move in order to free the driving discs from the driven discs 41. The amount of movement is determined by the length of the cups 53, these being accurately ground to size.

In a typical installation with a pressure plate set to move .240 inch for release, the cups 53 of the separators 46 are ground to permit the springs 54 to shift the right hand disc 33 .080 inch, and the cups 53 of the separators 47 are ground to permit a shift of .160 inch for the left hand disc 33.

When the clutch pedal (not shown) is released for engagement of the clutch, the pressure plate 18 moves toward the right to compress the discs 33 and 41. The rods 50, 50' are then thrust toward the right until the cups 53 engage the shoulders 52. If wear of the friction surfaces has decreased the thickness of the discs thereby permitting excessive movement of the pressure plate 18 under the influence of springs 17, this wear is automatically compensated for by sliding of the abutment forming friction rings 55 on the respective rods therefor.

It can be readily understood that should the cup 53 engage the shoulder 52 before the disc 33 has moved toward the right to the extent of its movement, the rod 50 will still continue its movement because of the relatively heavy pressure of the springs 17 and the snap ring 55 will slip thereon. Therefore, when the clutch is again disengaged, the right hand disc 33 will move .080 inch from its new position and the wear will have been automatically compensated for.

The separators 47 function in a similar manner for the left hand driving disc. Thus it is clear that my improved clutch disc centering device automatically compensates for wear of the clutch discs and assures smooth and complete release of the discs regardless of whether or not the lining thereof is new or badly worn. This compensation is accomplished without attention by service operators and thus eliminates clutch adjustments for wear throughout the life of the clutch.

Another advantage of my device resides in the positioning of the separators. As can be seen from the drawing, these devices are all disposed on the outside of the flywheel when they are away from the excessive heat of the clutch and are readily available for replacement if necessary.

In prior art devices, the clutch separator springs have been placed inside the clutch in close proximity to the discs where they are subject to excessive heat. This heat causes the springs to break or take a permanent set whereupon the separating function is destroyed and service troubles result. In the present embodiment, openings 56 are provided in the cylindrical portion of each of the devices 46, 47 and the cups 53 are perforated as shown. This assures good ventilation of the springs 54.

Although but one embodiment of the invention is herein shown and described, it will be understood that various changes in the size, shape and arrangement of parts may be made without departing from the spirit of my invention and it is not my intention to limit said invention other than by the terms of the appended claims.

What is claimed is:

1. In a clutch having a driving disc and a driven disc, means for engaging and disengaging said discs; means operably associated with one of said discs for separating it from the other disc in response to operation of said disengaging means comprising a rod disposed in engagement with said one disc; resilient means surrounding said rod for urging the latter in the direction tending to separate said discs; and abutment means for said resilient means carried by said rod and shiftable relative thereto as an incident to engagement of said discs for adjustably predetermining the movement of said rod.

2. In a clutch having a driving disc and a driven disc, means for engaging and disengaging said discs; means operably associated with one of said discs for separating it from the other disc in response to operation of said disengaging means comprising a rod disposed in engagement with said one disc; resilient means for urging said rod in the direction tending to separate said discs; a stop engaging said rod operable under the influence of said resilient means for predetermining the movement of said rod in said direction; and means operable as an incident to engagement of said discs for adjustably setting said stop relative to said rod whereby constant spacing is maintained between said discs regardless of wear.

3. In a clutch having interleaved driving and driven discs, a housing enclosing said discs; means operable when said clutch is disengaged for separating said discs comprising a casing secured to said housing; a rod slidably disposed in said casing and having one end thereof engaged with one of said discs; a cup slidably carried by said rod and adapted to engage a shoulder on said casing; a spring for urging said cup away from said shoulder; a snap ring on said rod for limiting sliding of said cup with respect to said rod and for limiting sliding of said rod with respect to said housing.

4. In a clutch having interleaved driving and driven discs, a housing enclosing said discs; means operable when said clutch is disengaged for separating said discs comprising a casing secured to said housing; a rod slidably disposed in said casing and having one end thereof engaged with one of said discs; a cup slidably carried by said rod and adapted to engage a shoulder on said casing; a spring for urging said cup away from said shoulder; a snap ring on said rod for limiting sliding of said cup with respect to said rod and for limiting sliding of said rod with respect to said housing, the disposition of said snap ring being such that the position thereof on said rod is set by thrust of said rod when the clutch is engaged whereby said disc is moved a constant distance away from the adjacent disc regardless of wear.

5. In a clutch having interleaved driving and driven discs, a housing structure for said discs, releasable engaging means for urging said discs into driving engagement; means operable upon release of said engaging means to relatively separate said discs comprising a rod member connected with one of said discs and relatively slidably mounted in the housing structure, a cup-like member receiving a portion of said rod member therein, a spring in the cup member surrounding said rod member acting thereon for urging the same relative to the housing and in a direction to relatively separate said discs upon release of said engaging means, and a ring operating between said members normally limiting relative movement thereof under the influence of said spring to thereby move said rod member in said direction for spacing of said discs as aforesaid, said ring frictionally engaging one of said members and being adjustably shiftable relative thereto under the influence of said engaging means to compensate for wear of said discs.

6. In a clutch having interleaved driving and driven discs, a housing structure for said discs, releasable engaging means for urging said discs into driving engagement; means operable upon release of said engaging means to relatively separate said discs comprising a rod member connected with one of said discs and mounted for movement relative to said housing structure in one direction in response to operation of said engaging means to engage said discs, a cup-like member receiving a portion of said rod member therein, a spring in the cup member surrounding said rod member and acting thereon for urging the latter in another direction to relatively separate said discs when the engaging means is released, and a stop frictionally positioned on one of said members and acting on the other thereof to limit relative movement of said members under the influence of said spring and adjustable relative to said one member under the influence of said engaging means and in response to variation in said movement of the latter due to wear of said discs.

7. In a clutch having driving and driven discs, releasable engaging means for urging said discs into driving engagement; means operable upon release of said engaging means to relatively separate said discs comprising a rod-like member connected with one of said discs and movable in one direction in response to movement of the engaging means to engage said discs, a hollow member receiving a portion of said rod member therein, a spring in the hollow member acting on said rod member for moving the latter in a direction opposite said one direction to relatively separate said discs upon release of said engaging means, and a stop frictionally positioned on one of said members and acting on the other thereof to limit relative movement of said members under the influence of said spring and adjustable relative to said one member under the influence of said engaging means and in response to variation in said movement of said engaging means due to wear of said discs.

DONALD A. BAIRD.